United States Patent
Lee et al.

(10) Patent No.: US 10,949,842 B1
(45) Date of Patent: Mar. 16, 2021

(54) PREVENTING DATA ANALYSIS INTERRUPTIONS BY IDENTIFYING CARD CONTINUITY WITHOUT USING PERSONALLY IDENTIFIABLE INFORMATION

(71) Applicant: MASTERCARD INTERNATIONAL INCORPORATED, Purchase, NY (US)

(72) Inventors: Edward M. Lee, Scarsdale, NY (US); Pavel Umanski, Yorktown Heights, NY (US); Margaret A. Shine, Stamford, CT (US)

(73) Assignee: Mastercard International Incorporated, Purchase, NY (US)

( * ) Notice: Subject to any disclaimer, the term of this patent is extended or adjusted under 35 U.S.C. 154(b) by 348 days.

(21) Appl. No.: 15/884,050

(22) Filed: Jan. 30, 2018

(51) Int. Cl.
*G06Q 20/38* (2012.01)

(52) U.S. Cl.
CPC .................... *G06Q 20/388* (2013.01)

(58) Field of Classification Search
USPC ........................................................ 705/44
See application file for complete search history.

(56) References Cited

U.S. PATENT DOCUMENTS

| | | | | |
|---|---|---|---|---|
| 5,436,965 A * | 7/1995 | Grossman | ............... | H04M 3/36 379/112.01 |
| 5,930,764 A * | 7/1999 | Melchione | ............ | G06Q 30/02 705/7.29 |
| 5,984,191 A * | 11/1999 | Chapin, Jr. | ...... | G06K 19/06187 235/487 |
| 6,700,960 B1 * | 3/2004 | Kaufman | ............. | H04M 15/00 379/112.01 |
| 7,546,262 B1 * | 6/2009 | Ferguson | ............... | G06Q 40/00 705/35 |
| 7,860,789 B2 * | 12/2010 | Hirka | ................... | G06Q 20/105 705/39 |

(Continued)

OTHER PUBLICATIONS

Bin Zhang, Zhonglin Lin, Wenjun Yin, Jin Dong and Minghua Zhu, "Establishing and refinement of customer profile using transactional data," 2008 IEEE International Conference on Service Operations and Logistics, and Informatics, Beijing, 2008, pp. 196-201. (Transactional Data) (Year: 2008).*

(Continued)

*Primary Examiner* — Chikaodinaka Ojiaku
(74) *Attorney, Agent, or Firm* — Foley & Lardner LLP

(57) ABSTRACT

The disclosed methods and systems provide a server that allows continuous transaction analysis by monitoring transaction data associated with different payment cards and detecting inactive cards. When the server receives a notification, from a transaction analysis server, that a data interruption related to an inactive card has occurred, the server determines a transaction pattern for the inactive card; monitors and detects newly activated cards; and determines a second transaction pattern for the newly activated cards. If the first and the second transaction patterns are similar, the server generates an instance within a dataset corresponding to the newly activated card that links the newly activated card to the inactive card. Furthermore, the server transmits an instruction to the transaction analytics server to continue the transaction analysis using data corresponding to the newly activated card.

20 Claims, 6 Drawing Sheets

(56) References Cited

U.S. PATENT DOCUMENTS

| | | | | |
|---|---|---|---|---|
| 7,873,528 B2* | 1/2011 | Bregante | G06Q 20/4016 | 705/4 |
| 7,878,394 B2* | 2/2011 | Johnson | G06Q 20/34 | 235/380 |
| 8,078,515 B2* | 12/2011 | John | G06Q 30/0613 | 705/35 |
| 8,191,766 B2* | 6/2012 | Tomchek | G06Q 40/12 | 235/376 |
| 8,412,604 B1* | 4/2013 | Graham | G06Q 30/0204 | 705/35 |
| 8,768,724 B2* | 7/2014 | Whiddon | G06F 19/3456 | 705/2 |
| 8,818,847 B2* | 8/2014 | Carpenter | G06Q 30/0229 | 705/14.25 |
| 9,141,460 B2* | 9/2015 | Kantareddy | G06Q 10/00 | |
| 9,203,962 B2* | 12/2015 | Guerra | H04M 3/4936 | |
| 9,582,485 B2* | 2/2017 | Greenberg | G06F 3/0484 | |
| 9,704,195 B2* | 7/2017 | Zoldi | G06Q 30/0224 | |
| 9,729,727 B1* | 8/2017 | Zhang | H04M 15/47 | |
| 10,127,130 B2* | 11/2018 | Sengupta | G06Q 10/06 | |
| 10,140,576 B2* | 11/2018 | Eldardiry | G06F 21/552 | |
| 10,235,430 B2* | 3/2019 | N | G06F 3/0482 | |
| 10,346,845 B2* | 7/2019 | Sherlock | G06Q 20/3825 | |
| 2002/0062249 A1* | 5/2002 | Iannacci | G06Q 20/105 | 705/14.1 |
| 2002/0128960 A1* | 9/2002 | Lambiotte | G06Q 40/025 | 705/38 |
| 2003/0061157 A1* | 3/2003 | Hirka | G07F 7/025 | 705/39 |
| 2004/0117300 A1* | 6/2004 | Jones | G07F 7/025 | 705/39 |
| 2004/0225776 A1* | 11/2004 | DiRaimondo | G07F 7/127 | 710/200 |
| 2005/0097039 A1* | 5/2005 | Kulcsar | G06Q 40/00 | 705/40 |
| 2005/0109838 A1* | 5/2005 | Linlor | G06Q 20/04 | 235/380 |
| 2005/0121513 A1* | 6/2005 | Drummond | G06Q 20/102 | 235/381 |
| 2005/0216824 A1* | 9/2005 | Ferguson | G06Q 20/12 | 715/205 |
| 2006/0149671 A1* | 7/2006 | Nix | G06Q 20/40 | 705/40 |
| 2006/0208065 A1* | 9/2006 | Mendelovich | G06Q 30/02 | 235/380 |
| 2007/0043659 A1* | 2/2007 | Kass | G06Q 30/02 | 705/38 |
| 2007/0252002 A1* | 11/2007 | Guillot | G06Q 20/12 | 235/380 |
| 2008/0077525 A1* | 3/2008 | Willey | G06Q 20/102 | 705/40 |
| 2008/0082418 A1* | 4/2008 | Fordyce | G06Q 30/0207 | 705/14.34 |
| 2008/0099551 A1* | 5/2008 | Harper | G06Q 20/342 | 235/380 |
| 2008/0118050 A1* | 5/2008 | Rodenbusch | H04M 3/5158 | 379/265.02 |
| 2008/0120234 A1* | 5/2008 | Jagatic | G06Q 20/40 | 705/44 |
| 2008/0222038 A1* | 9/2008 | Eden | G06Q 20/20 | 705/44 |
| 2008/0277465 A1* | 11/2008 | Pletz | G06Q 30/02 | 235/379 |
| 2009/0070260 A1* | 3/2009 | Flitcroft | G06Q 20/342 | 705/41 |
| 2009/0119204 A1* | 5/2009 | Akella | G06Q 20/357 | 705/39 |
| 2009/0171839 A1* | 7/2009 | Rosano | G06Q 20/12 | 705/40 |
| 2009/0222384 A1* | 9/2009 | Rowan | G06Q 30/00 | 705/80 |
| 2009/0234874 A1* | 9/2009 | Sylvain | G06Q 10/107 | |
| 2010/0174644 A1* | 7/2010 | Rosano | G06Q 20/102 | 705/40 |
| 2010/0264227 A1* | 10/2010 | Joyce | G06K 19/077 | 235/493 |
| 2010/0287093 A1* | 11/2010 | He | G06Q 40/025 | 705/38 |
| 2010/0299253 A1* | 11/2010 | Patterson | G06Q 40/02 | 705/40 |
| 2011/0016052 A1* | 1/2011 | Scragg | G06Q 20/405 | 705/44 |
| 2011/0054981 A1* | 3/2011 | Faith | G06Q 30/0269 | 705/7.36 |
| 2011/0125633 A1* | 5/2011 | Aaltonen | G06Q 20/10 | 705/39 |
| 2011/0194679 A1* | 8/2011 | Patisaul | H04M 15/00 | 379/142.04 |
| 2011/0295631 A1* | 12/2011 | Kennedy | G06Q 40/06 | 705/7.11 |
| 2011/0320358 A1* | 12/2011 | Harris | G06Q 20/042 | 705/45 |
| 2013/0060587 A1* | 3/2013 | Bayrak | G06Q 10/10 | 705/7.11 |
| 2013/0090098 A1* | 4/2013 | Gidwani | H04M 1/72566 | 455/414.1 |
| 2014/0040051 A1* | 2/2014 | Ovick | G06K 9/00255 | 705/16 |
| 2014/0258099 A1* | 9/2014 | Rosano | G06Q 20/409 | 705/39 |
| 2016/0148177 A1* | 5/2016 | Best | G06Q 20/363 | 705/65 |
| 2016/0203490 A1* | 7/2016 | Gupta | G06Q 20/4016 | 705/44 |
| 2018/0145874 A1* | 5/2018 | Steeves | H04L 41/069 | |

OTHER PUBLICATIONS

K. K. Sherly and R. Nedunchezhian, "BOAT adaptive credit card fraud detection system," 2010 IEEE International Conference on Computational Intelligence and Computing Research, Coimbatore, 2010, pp. 1-7 (BOAT). (Year: 2010).*

C. S. Ananian, K. Asanovic, B. C. Kuszmaul, C. E. Leiserson and S. Lie, "Unbounded Transactional Memory," in IEEE Micro, vol. 26, No. 1, pp. 59-69, Jan.-Feb. 2006, (Memory) (Year: 2006).*

* cited by examiner

| Industry | Card Spend Index | Average Spend Per Acct national | Index | Tier and Assignment |
|---|---|---|---|---|
| Dining | 300 | 100 | 3 | 3 |
| Auto Fuel Industry | 10 | 140 | 0.1 | A |
| Groceries | 200 | 150 | 1.3 | C |
| Home Improvement | 500 | 150 | 3.3 | F |
| Leisure | 90 | 180 | 0.5 | G |
| Wholesale Club | 400 | 550 | 0.7 | 1 Spend Across 3 months |
| Dining | 300 | 100 | 3 | 3 |
| Auto Fuel Industry | 10 | 140 | 0.1 | B |
| Groceries | 200 | 150 | 1.3 | 2 |
| Home Improvement | 500 | 150 | 3.3 | N |
| Leisure | 90 | 180 | 0.5 | 3 |
| Wholesale Club | 400 | 550 | 0.7 | G Spend Across 6 months |
| Zip | | | | Default from Experian |
| Gender | | | | Default from Experian |
| Income | | | | Default from Experian |
| Presence of Children | | | | Default from Experian |
| Age Tier | | | | Default from Experian |

Card A 510
Card B 520
500

FIG. 5

PREVENTING DATA ANALYSIS INTERRUPTIONS BY IDENTIFYING CARD CONTINUITY WITHOUT USING PERSONALLY IDENTIFIABLE INFORMATION

TECHNICAL FIELD

This application relates generally to generating and manipulating datasets associated with efficient analytics processing and minimizing data analytics interruptions.

BACKGROUND

As the processing power of computers allow for greater computer functionality and the Internet technology era allows for interconnectivity between computing systems, card processors rely on highly complex computer infrastructures to facilitate transactions using electronic payment cards. Currently, various computer environments allow a card processing computing system to receive card identifiers from a merchant (e.g., via an electronic point of sale device or through a computing device when users conduct online shopping) and to process the payment by debiting the users' account associated with the card issuing computing system, and crediting an account associated with the merchant. Large volumes of data generated when using different payment cards (at each of the above-mentioned steps) and customers' expectation of faster payment processing has rendered the use of computers a necessity when facilitating payments and transactions.

Card processing computing systems have a growing desire to analyze transaction data associated with each payment card and/or each cardholder. Different merchants may request detailed transaction analysis (e.g., number of customers and the amount of money spent) from the card processing computing systems. However, existing and conventional methods providing transaction analytics have not been satisfactory due to technical shortcomings. For example, for technical and other reasons (e.g., complying with consumer privacy standards), card issuers do not share personally identifiable information of cardholders with the card processing computing systems and further do not notify the card processing computing systems when a payment card becomes inactive (e.g., the cardholder has ceased using the card or the card has been cancelled or expired). As a result, the computing infrastructure utilized by the card processing computing systems may have computational gaps, data interruptions, and discontinuities when performing transaction analysis on inactive cards. These data interruptions may lead to erroneous results. Existing and conventional methods have failed to provide fast, efficient, and continuous analysis of transaction data associated with different payment cards due to the above-mentioned data interruptions. For example, a consumer may use a payment card, cancel the card, and start using another card to acquire services from a merchant; conventional methods may either not analyze the inactive payment card due to the data interruption, or may determine that the cards belong to two different consumers. Both of the above-mentioned results are erroneous and unacceptable. Therefore, there is a desire for a computing technology and a software solution to address these challenges.

SUMMARY

For the aforementioned reasons, there is a need for a more efficient and accurate system and method for eliminating data interruptions and continuously processing large electronic payment card user datasets, which would allow accurate analysis of transaction data in a more efficient manner than possible with conventional computer data-driven analysis or any solution not involving a computer. There is a need for a network and computer-specific set of rules to produce efficient and accurate results when facing data interruptions without using cardholders' personally identifiable information and in a privacy-compliant manner.

In an embodiment, a method comprises continuously monitoring, by a server, one or more datasets stored in a database, each dataset comprising electronic transaction data corresponding to an electronic payment card; detecting, by the server, a set of inactive datasets from the one or more datasets comprising a first inactive dataset including electronic transaction data corresponding to a first electronic payment card associated with a first user where there is no electronic transaction data corresponding to the electronic payment card within a first pre-determined time period prior to a time of detection of each respective inactive dataset; receiving, by the server, from a transaction analytics server, an indication of an interruption of data for transaction data analysis associated with the first inactive dataset; upon receiving the indication, deriving, by the server, a first electronic transaction pattern value for the first inactive dataset that comprises a first string of alphanumeric characters, where each character and character position in the first string corresponds to at least one of a location, time, and transaction amount associated with each electronic transaction and a total number of electronic transactions associated with the first electronic payment card within the first inactive dataset; identifying, by the server, a set of orphan datasets from the one or more datasets comprising a first orphan dataset including electronic transaction data corresponding to a second electronic payment card associated with a second user where the electronic transaction data starts during the first pre-determined time period; deriving, by the server, a second electronic transaction pattern value for the first orphan dataset that comprises that comprises a second string of alphanumeric characters, where each character and character position in the second string corresponds to at least one of a location, time, and transaction amount associated with each electronic transaction and a total number of electronic transactions associated with the second electronic payment card within the first orphan dataset; upon the first and the second electronic transaction pattern value satisfying a similarity threshold representing a minimum number of identical characters in the first string and the second string, generating, by the server, an instance within the first inactive dataset that links the first orphan dataset to the first inactive dataset; and transmitting, by the server, to the transaction analytics server, an instruction to continue the transaction data analysis associated with the first inactive dataset using data linked from the first orphan dataset.

In another embodiment, a computer system comprises a database comprising one or more datasets comprising electronic transaction data corresponding to an electronic payment card; an analytics server comprising a first processor and a first non-transitory computer readable medium comprising instructions that are configured to be executed by the first processor to: continuously monitor one or more datasets stored in the database; detect a set of inactive datasets from the one or more datasets comprising a first inactive dataset including electronic transaction data corresponding to a first electronic payment card associated with a first user where there is no electronic transaction data corresponding to the electronic payment card within a first pre-determined time period prior to a time of detection of each respective inactive dataset; receive, from the transaction analytics server, an indication of an interruption of data for transaction data analysis associated with the first inactive dataset; upon receiving the indication, derive a first electronic transaction pattern value for the first inactive dataset that comprises a first string of alphanumeric characters, where each character and character position in the first string corresponds to at least one of a location, time, and transaction amount associated with each electronic transaction and a total number of electronic transactions associated with the first electronic payment card within the first inactive dataset; identify a set of orphan datasets from the one or more datasets comprising a first orphan dataset including electronic transaction data corresponding to a second electronic payment card associated with a second user where the electronic transaction data starts during the first pre-determined time period; derive a second electronic transaction pattern value for the first orphan dataset that comprises that comprises a second string of alphanumeric characters, where each character and character position in the second string corresponds to at least one of a location, time, and transaction amount associated with each electronic transaction and a total number of electronic transactions associated with the second electronic payment card within the first orphan dataset; upon the first and the second electronic transaction pattern value satisfying a similarity threshold representing a minimum number of identical characters in the first string and the second string, generate an instance within the first inactive dataset that links the first orphan dataset to the first inactive dataset; and transmit to the transaction analytics server, an instruction to continue the transaction data analysis associated with the first inactive dataset using data linked to the first orphan dataset by the generated instance; and the transaction analytics server comprising a second processor and a second non-transitory computer readable medium comprising instructions that are configured to be executed by the second processor to transmit an indication of an interruption of data for transaction data analysis associated with the first inactive dataset.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

FIG. 5 illustrates generating an electronic transaction pattern value for a dataset, according to an embodiment.

DETAILED DESCRIPTION

Figure 1:
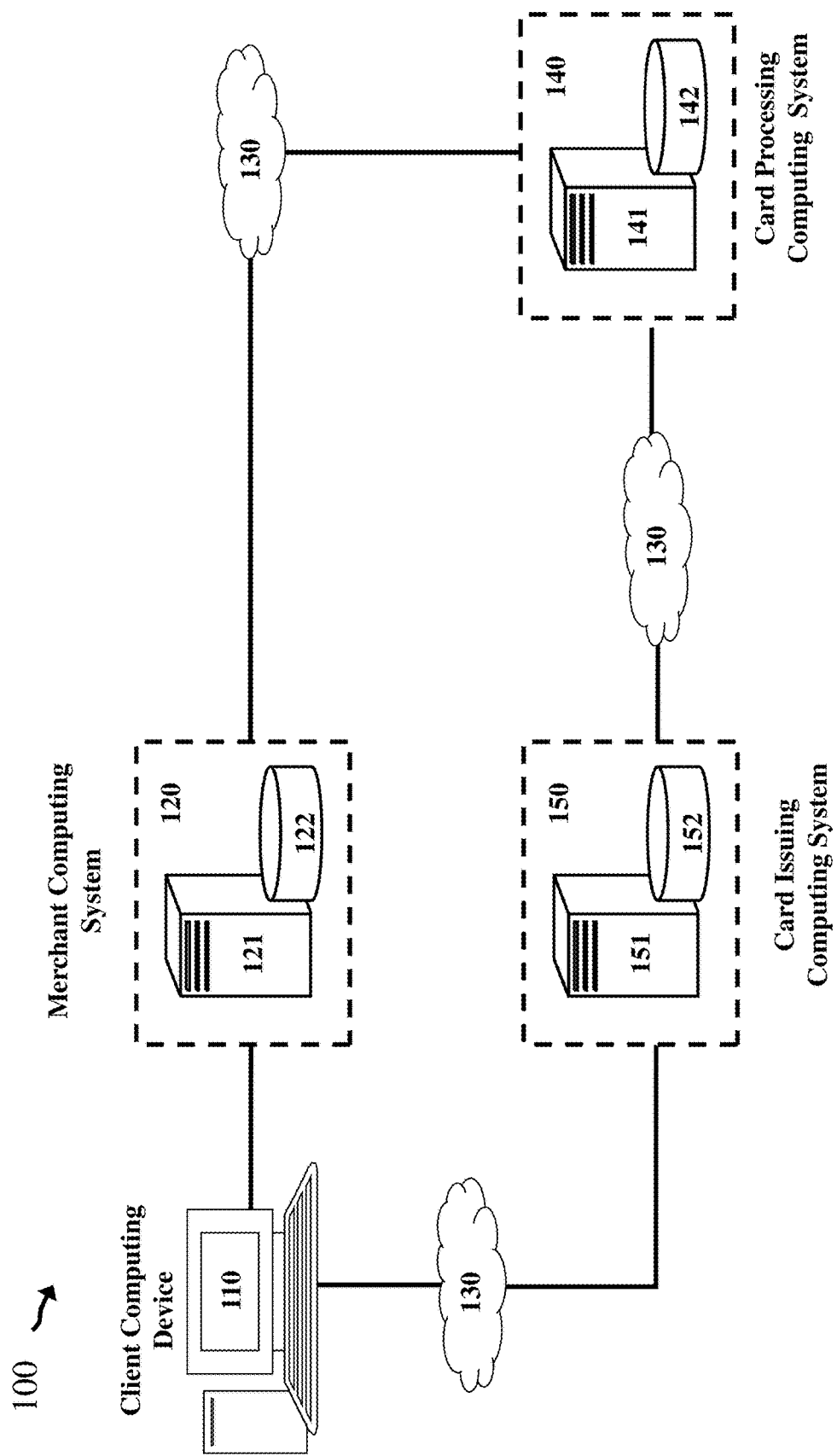
FIG. 1 illustrates an example of a payment system for facilitating a payment using a payment card, according to an embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention. As used herein, "card," "electronic card," "credit card," "payment card," and "electronic payment card" refer both to physical payment cards and to electronic payment accounts that may not utilize a physical card to complete a financial transaction, such as electronic wallets and other electronic payment applications. Furthermore, the above-mentioned terms have been interchangeably used.

FIG. 1 is a schematic diagram that illustrates an overview example of key components and the data flow between key components of a computer-implemented payment system configured to facilitate a payment using an electronic payment card (e.g., credit card, debit card, stored value card). The system 100 comprises client computing device 110, merchant computing system 120, card processing computing system 140, card issuing computing system 150, and network 130 that allows different computing systems of the system 100 to communicate with each other.

As a non-limiting example of a payment with a payment card, when a transaction is initiated (e.g., a client operating the client computing device 110 has initiated transferring money to a merchant operating the merchant computing device 120), the merchant computing system 120 receives information of the payment card issued by the card issuing computing system 150 (e.g., credit card and the like). In an example, the merchant computing system 120 may provide a graphical user interface and receive a payment card identifier from a client via the client computing device 110 (e.g., the merchant is an online shopping website). The merchant computing system 120 may comprise an internal database 122 and a server 121 to acquire/store the card identifier and transmit data to the card processing computing system 140. The payment card identifier may be a 16-digit credit card number or any other card number issued by the card issuing computing system 150. In other embodiments, the merchant computing system 120 may provide a point of sale (POS) terminal or any other computing devices configured to acquire the payment card identifier from the card itself using a variety of existing methods such as a magnetic strip located on or attached to the payment card, near field communication, or input into a computer (e.g., via a website). The merchant computing system 120 may transfer the card payment identifier (via the network 130) to the card processing computing system 140.

The card processing computing system 140 may then (via the server 141) identify the card issuing computing system 150 based on the card identifier, a transaction amount from the merchant computing system 120, and authenticate/validate the identity of the client (or the client computing device 110) and store said data in an internal database 142. Upon validating the transaction, the card processing computing system 140 may approve the transaction and may query an account record of the client within the card issuing computing system 150 (e.g., data storage 152). The card issuing computing system 150 (via the server 151) may approve the transaction by determining whether the client's account has a sufficient balance to accommodate the transaction. For example, upon the client account having a sufficient balance, the card issuing computing system 150 may transmit a signal to the card processing computing system 140 and approve the transaction. The card processing computing system 140 may then generate an instruction to debit the client's account and transmit the instruction to the card issuing computing system 150. The card processing computing system may also generate another instruction to credit an account associated with the merchant computing system 120 and transmit the second instruction to a financial institution computing system (not shown here) associated with the merchant computing system 120. In some embodiments, the card processing computing system 140 may approve transactions that satisfy a certain thresholds (e.g., transaction amounts less than a pre-determined value or a client who satisfies a certain criteria such as a high value client or a client with a payment card associated with a high spend band). The card processing computing system 140 may then issue debit instructions and transmit the debit instructions to the card issuing computing system 150 in batches and at a later time (e.g., predetermined period). The card processing computing system 140 may also gather all the data generated from the above-mentioned steps and store the data in an internal or an external database (e.g., database 142). As described below, the data stored in database 142 may be used to perform various transactional data analysis. Key components illustrated in FIG. 1 represent the existing computing system to facilitate payments using payment cards and performing transaction analysis. The present disclosure provides a computer-implemented method to improve an existing computer infrastructure. A non-limiting example of the computer infrastructure that implements the method disclosed herein is the system 200 described in FIG. 2.

Figure 2:
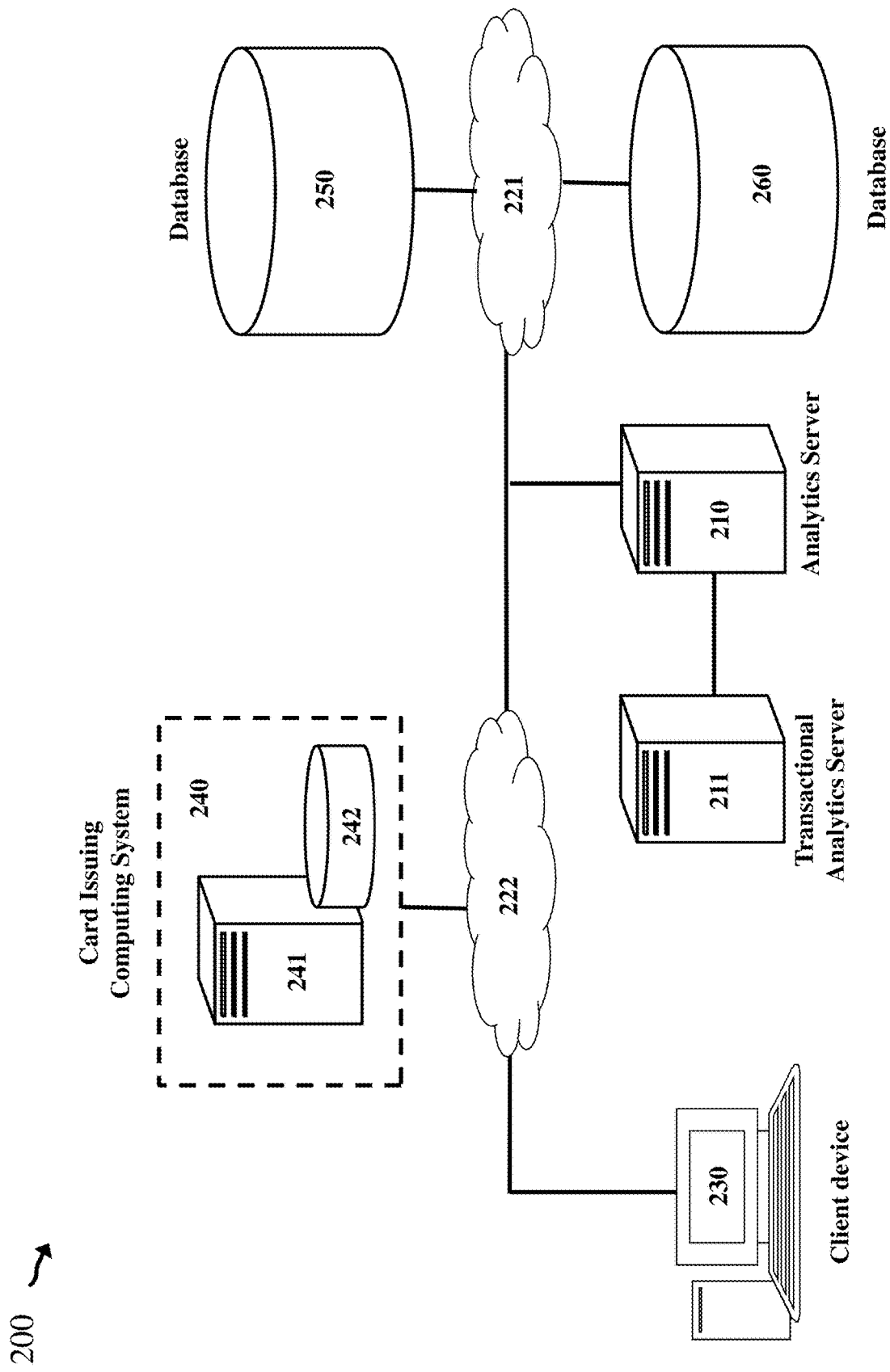
FIG. 2 illustrates an example of a system for preventing interruptions in transaction data analytics, according to an embodiment.

FIG. 2 illustrates components of a system 200, according to an exemplary embodiment. The system 200 comprises an analytics server 210 and a transactional analytics server 211 associated with a payment processing computing system such as the card processing computing system 140 illustrated in FIG. 1, a database server 241 and a database 242 associated with a card issuing computing system 240 or the analytics server 210, communication network 221-22, client device 230, and databases 250, 260. The client device 230 may communicate with the analytics server 210 or the transactional analytics server 211 via the communication network 222, such as the Internet or any other public or private network. The client device 230 may also be in connection with the card issuing computing system 240 via the analytics server 210. The client device 230 may be a component of card processing computing system 140 or a merchant computing system. For example, an administrator associated with the merchant computing system may operate the client device 230.

In operation, the client device 230 may request the analytics server 210 or the transactional analytics server 211 to derive various forms of analytical information from the data records of the database 250 and/or 260 (e.g., transaction data records) and may request the transaction data to be analyzed (e.g., compared). For example, a merchant operating the client device 230 may request the transactional analytics server 211 to analyze all the transactions conducted via any payment card issued by the card issuing computing system 150. The merchant operating the client device 230 may further request the transactional analytics server 211 to provide details of the transactions (e.g., how many consumers have transacted with the merchant, what the average transaction amount for each cardholder/consumer). As described above, when a cardholder changes payment cards (e.g., payment card A expires and the cardholder activates payment card B), the transaction analytics server 211 may determine that payment card A and B belong to two different consumers transacting with the merchant, which results in erroneous data analytics. The transaction analytics server 211 may also be forced to terminate its data analysis because datasets corresponding to card A may provide no additional data (e.g., the data is incomplete due to the card expiration). As described below, the analytics server 210 may receive an indication that the transaction analytics server 211 has encountered a data interruption (e.g., the transaction analytics server 211 is analyzing a dataset that corresponds to an inactive payment card), may determine a newly activated payment card that corresponds to the same cardholder as the inactive payment card, and may link the newly activated payment card and the inactive payment card in order to solve the data interruption and allow the transaction analytics server 211 to continue analyzing transaction data corresponding to the cardholder and his payment cards.

In some embodiments, the client device 230 may be (legally or technically) prevented or blocked from accessing data from any of the databases 242, 250 and/or 260, and the analytics server 210 (or any other computing device within the card processing computing system such as transactional analytics server 211) may also be prevented or blocked from accessing any proprietary raw data or any personally identifiable information associated with any electronic payment cards issued by the card issuing computing system 240. For example, analytics server 210 may only have access to different electronic transaction data associated with each electronic payment card issued by the card issuing computing system 240 and may not have access to any data indicating to whom the electronic payment card has been issued or any of the cardholder's personally identifiable information. In some embodiments, the analytics server 210 may use different networks (e.g., network 221 and/or 222) to communicate and transmit only derived data to the client device 230, card issuing computing system 240, database 250, and database 260 in order to avoid granting access to either of the above-mentioned computing devices to the data stored within any of the computing devices described in FIG. 2 and in order to comply with consumer privacy standards.

The client device 230 may access a web-based service, a graphical user interface, or an application hosted by the analytics server 210, from which the administrator operating the client device 230 may provide various types of data and may request the analytics server 210 or the transaction analytics server 211 to perform various analytics on merchant transactions. In some embodiments, the analytics server 210 may host an application server or a special graphical user interface, which may comprise software modules allowing client device 230 to access and manipulate data, and provide instructions to the analytics server 210 or the transaction analytics server 211. For example, the analytics server 210 may comprise a webserver allowing the client device 230 to access data that is collected and manipulated by an analytics server 210 or the transaction analytics server 211. In this example, a user operating the client device 230 may point a web browser application executed by the client device 230 to a website hosted on the webserver (or otherwise by the analytics server 210) in order to access the analytics service and view the results. The user may instruct the analytics server 210 or the transaction analytics server 211 to access various forms of data and may further input the parameters needed to conduct transaction analysis and/or determine an appropriate newly activated electronic payment card. In another example, where the analytics server 210 comprises a webserver hosting a web-accessible application, the client device 230 may be a mobile device (e.g., tablet, laptop, smart phone) executing a software application provided and executed by the analytics server 210. In this example, the user may use the mobile application to provide instructions to the analytics server 210 or the transaction analytics server 211, and to review outputted user interfaces on the mobile device. Even though the graphical user interface has been described as being displayed and managed by the analytics server 210, a person skilled in the relevant art will recognize that the graphical user interface may be generated, updated, rendered, and managed by either the analytics server 210 or the transaction analytics server 211.

Figure 6:
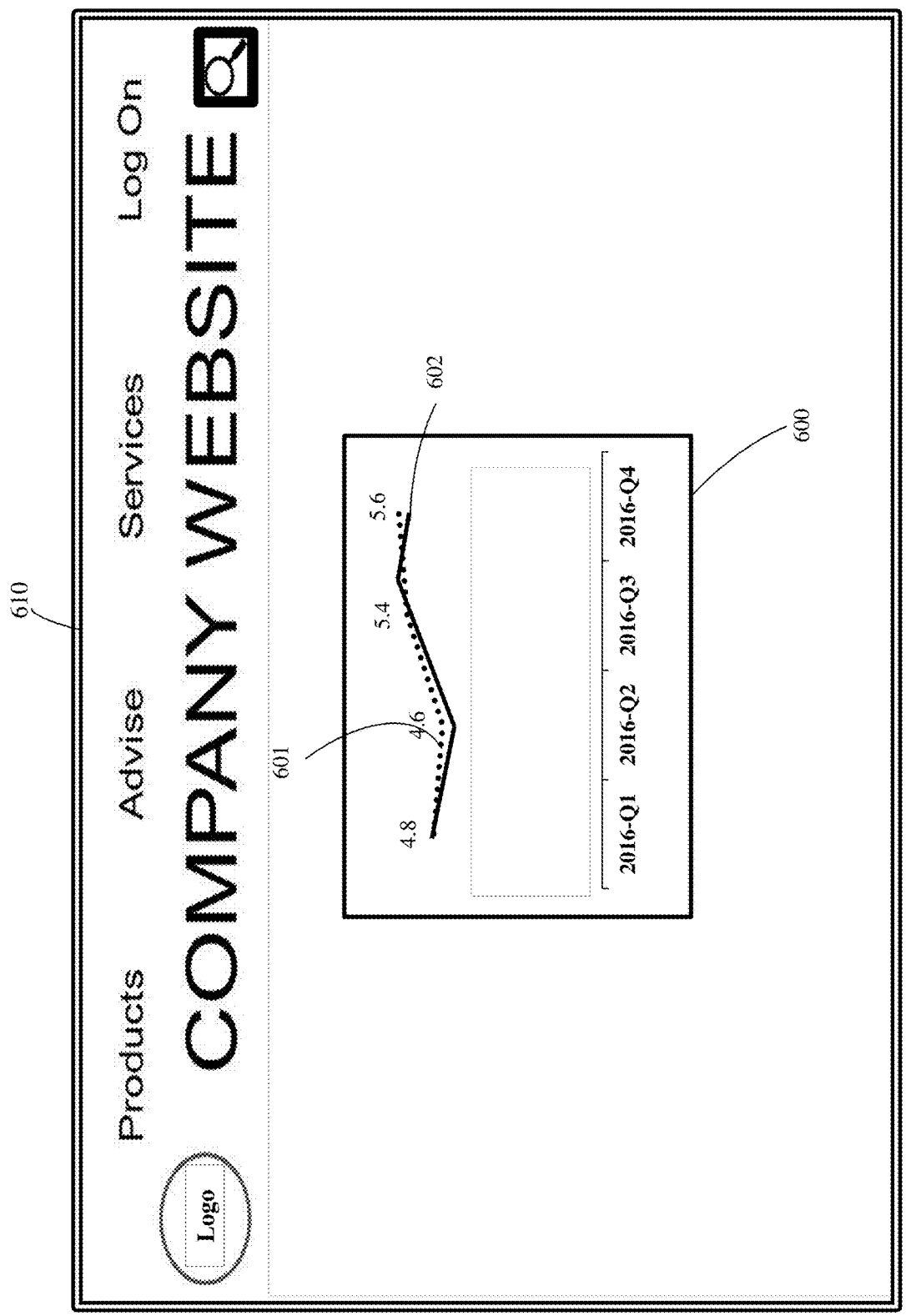
FIG. 6 illustrates different comparison data displayed on a graphical user interface of a client computing device, according to an embodiment.

The webserver may have access to one or more databases or pre-stored web-based interfaces, such as webpages, comprising a number of preconfigured sub-interfaces, such as container 600 (as shown in FIG. 6) dynamically populated from the data analyzed by the analytics server 210 or the transaction analytics server 211. For example, webpages may contain code, such as HTML or PHP, presenting a website of any number of webpages having a common "look-and-feel." One or more output or results-display webpages may contain additional code for containers, where the container code displays information or data that is configured to be dynamically and continuously generated using ongoing analysis. In this example, the data may be a study of the performance of a particular entity (e.g., the amount of money that each consumer spends at the entity using electronic payment card issued by the card issuing computing system 240). The webserver may make calls to the records of an analytics database (e.g., any database associated with the analytics server 210) in order to populate the sub-interfaces of the output webpage with the appropriate data, while the webpage display is configured to maintain the website's common aesthetic.

The client device 230 may be any computing device comprising a processor capable of performing the various tasks and processes described herein. Non-limiting examples of a client device 230 may include a server, desktop, laptop, tablet, and the like. The client device 230 comprises any number of computer-networking components (e.g., network interface card) that facilitate inter-device communications via the communication network 222. Although the communication network 221 and 222 are shown as separate and distinct communication networks, in some embodiment a single communication network may connect all the computing devices described in FIG. 1 and the analytics server 210 may use variety of known methods to separate the proprietary data of different computing systems.

The card issuing computing system 240 may be an institution that issues electronic payment apparatus such a payment card (e.g., credit card) to different users and card holders. As described above, the card issuing computing system 240 may be prevented from accessing other card issuing computing devices associated with database 250 and 260 and may further prevent the analytics server 210 from accessing card holder's personally identifiable information, which may be stored in the database 242. For example, card issuing computing system 240 may not share name or other identification information associated with the cardholder but may share geographic location of the cardholder (e.g., zip code), income level, or age of the cardholder, or other non-personally identifiable information with the analytics server 210. The database 242 may contain any data associated with the users (e.g., services provided to the cardholders, payment information, transaction data and attributes, payment type, each card issued to the cardholders, spend band, percentage of payment in person, percentage of online payments, and the above-mentioned personally identifiable and personally non-identifiable information) and may be hosted on any number of computing devices comprising a non-transitory machine-readable storage medium capable of storing data records received from the database server 241, and in some cases, received from the analytics server 210, the client device 230, or other computing devices (e.g., websites or cloud service providers). The database 242 may further comprise a processor capable of executing various queries and data record management processes, according to instructions from the analytics server 210 or the database server 241. The database 242 may be the same computing device as the database server 241, or be hosted on a distinct computing device that is in networked-communication with the analytics server 210. The database server 241 may communicate data records and instructions to and from the analytics server 210, where the data records may be stored into the database 242 and where various analytics may be performed on the data by the database server 241 in accordance with the instructions from the analytics server 210, transaction analytics server 211, or (indirectly by) the client device 230 via communication network 222. The database server 241 may be any computing device comprising a processor capable of performing the various tasks and processes described herein. Non-limiting examples of the database server 241 may include a server, desktop, laptop, tablet, and the like. The database server 241 comprises any number of computer-networking components (e.g., network interface card) that facilitate inter-device communications via the communication network 222. There may be any number of distinct computing devices functioning as the database server 241 in a distributed computing environment. The database server 241 may host an online service, such as cloud-computing application service, or any other service that provide customer-facing web-based applications that collect customer data through web-based transactions with the client device 230 over one or more networks such as the communication network 222.

The analytics server 210 and the transaction analytics server 211 may perform various analytics on data records stored in the database 250, 242, and/or 260 and transmit the results to the client device 230. In an embodiment, the analytics server 210 and transaction analytics server 211 each comprise a processor and a non-transitory computer readable medium comprising instructions that are configured to be executed by the processor. The analytics server 210 may be any computing device comprising a processor capable of performing the various tasks and processes described herein. Non-limiting examples of the analytics server 210 may include a server, desktop, laptop, tablet, and the like. The analytics server 210 comprises any number of computer-networking components, which facilitate inter-device communications via the communication network 221 and/or 222. There may be any number of distinct computing devices functioning as the analytics server 210 in a distributed computing environment.

The databases 250 and 260 may be associated with different card issuing computing systems other than the card issuing computing system 240. Databases 250 and 260 may store data records that are associated with several users associated with various different cards issued, where the data records each contain at least one field identifying which user account was associated with a particular data field. The databases 250 and/or 260 may store personal attributes and payment data associated with each user such as name, user identifiers (e.g., non-personally identifiable data such as geographic location of the cardholder), payment type, each card issued to the user, spend band, percentage of payment in person, percentage of online payments, and the like. The databases 250 and 260 may also store data records generated and/or received by the analytics server 210. For example, the analytics server 210 may derive and analyze raw data from the databases 250 and/or 260 and may store the derived data within said databases.

Figure 3:
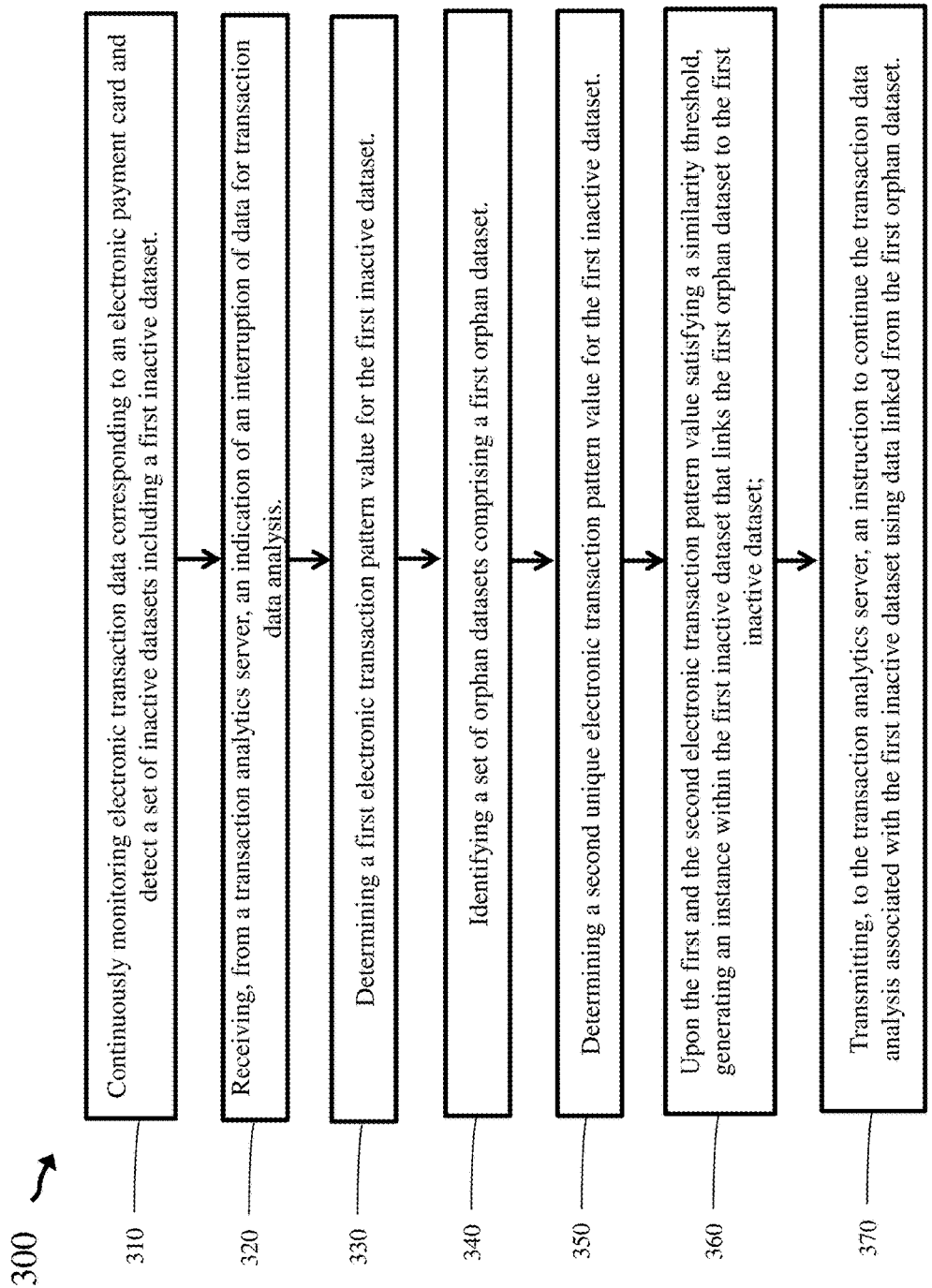
FIG. 3 illustrates a flowchart depicting operational steps for preventing interruptions in transaction data analytics, according to an embodiment.

Referring now to FIG. 3, a flowchart depicting operational steps for preventing interruptions in transaction data analytics is illustrated, in accordance with an embodiment. Steps of the method 300 may be implemented using one or more modules of the analytics server, the transaction analytics server, the databases, and the client device. FIG. 3 does not imply any limitations with regard to the environments or embodiments that may be implemented. Modifications to the depicted environment or embodiment shown in FIG. 3 may be made. Furthermore, all implementation of the method 300 use no personally identifiable consumer data and are performed in a consumer privacy compliant manner.

At step 310, the analytics server may continuously monitor one or more datasets stored in a database, each dataset comprising electronic transaction data corresponding to an electronic payment card and detect a set of inactive datasets from the one or more datasets comprising a first inactive dataset including electronic transaction data corresponding to a first electronic payment card associated with a first user where there is no electronic transaction data corresponding to the electronic payment card within a first pre-determined time period prior to a time of detection of each respective inactive dataset. The analytics server may continuously monitor all the transaction data corresponding to different payment cards (e.g., credit cards) in order to identify a set of payment cards with no transactions within a pre-determined time period (e.g., inactive credit cards). For example, the analytics server may determine one or more payment cards that have not been used in the past 3 months (e.g., do not have any transaction data within the last 3 months). In some embodiments, all transactions corresponding to payment cards may be organized within the memory structure of the databases as a dataset; for example, payment card 123 may have a corresponding dataset 123 that contains information regarding the payment card 123 (e.g., personally non-identifiable information associated with the cardholder if available, transaction data, and the like). The inactivity time threshold may be predetermined or may be received from the client device (e.g., administrator operating the client device). The analytics server may continuously monitor all transaction data within different databases and corresponding to different payment cards issued by different card issuing computing systems in order to detect all inactive payment cards.

At step 320, the analytics server may receive, from a transaction analytics server, an indication of an interruption of data for transaction data analysis associated with the first inactive dataset. In some embodiments, the analytics server may receive, from the client computing device, a request to analyze transaction data associated with a merchant to be performed by the transaction analytics server. For example, as described above, a merchant operating the client device may request that the analytics server (or the transaction analytics server) analyze all the transactions associated with the merchant. Upon receiving the request, the transaction analytics server may query transaction data from various databases (such as database 242, 250, and/or 260) and analyze the transaction data. However, the transaction analytics server may encounter an inactive dataset (e.g., a dataset corresponding to an inactive payment card), which may interrupt the data analysis. The data analysis may be interrupted because the transaction analytics server may not have sufficient transaction data to analyze. Upon encountering a data/analysis interruption, the transaction analytics server may transmit an indication (e.g., notification message) to the analytics server and notify the analytics server of the data interruption and the specific dataset causing the data interruption.

In some embodiments, the analytics server may generate a graphical user interface (GUI) comprising a set of input fields and configured to be displayed on the client device. For example, the GUI can include an electronic form for completion by an administrator operating the client device, where the electronic form includes a plurality of graphical elements (e.g., text fields, buttons, sliders, checkboxes, dropdown menus, and the like) for interaction with the administrator, and where the electronic form may be associated with a request to perform various transaction analysis. In an example, the administrator operating the client computing device may request the transactional analytics server to determine all consumer transactions and the number of cardholders purchasing merchandise form the merchant within the last three months. An example of the GUI generated and hosted by the analytics server may be a website. The analytics server may host a website accessible to the end-users (e.g., administrator operating the client device), where the content presented via the various webpages may be controlled based upon each particular user's role. In an example, the administrator (operating the client device) may log into the website provided by the analytics server and request the analytics server (or the transaction analytics server) to perform transaction analysis. The transaction analytics server, upon receiving this request, may first query one or more databases (external databases such as database 242 and internal databases such as 250 and/or 260) and receive all payment card datasets (e.g., data corresponding to different payment cards) and analyze the data received. The transaction analytics server may further display the results on the GUI.

At step 330, the analytics server may derive a first electronic transaction pattern value for the first inactive dataset that comprises a first string of alphanumeric characters, where each character and character position in the first string corresponds to at least one of a location, time, and transaction amount associated with each electronic transaction and a total number of electronic transactions associated with the first electronic payment card within the first inactive dataset. Upon receiving the indication of data interruption, the analytics server may determine whether the payment card (or a corresponding dataset) causing the data interruption is an inactive card. If so, the analytics server may query all transaction data related to the inactive card and determine an electronic transaction pattern value for the inactive payment card based on multiple factors such as spending categories (e.g., dining, everyday spending, auto fuel, groceries, home improvement, wholesale club, and leisure), amount of each transaction corresponding to each spending category, and a ratio of each transaction amount and the national average. The analytics server may also include other information such as time and location of transactions, payment patterns (e.g., whether the payment card balance is paid fully and on time). The analytics server may query the dataset for each inactive payment card and analyze transaction data corresponding to a predetermined time period. For example, the analytics server may determine the electronic transaction pattern values based on all the transactions related to an inactive card for the previous five months. The above-mentioned time period may be pre-determined or may be received from the client device. Furthermore, the analytics server may use one or more of the above-mentioned factors to determine the electronic transaction pattern value for each inactive payment card. The number of factors determines a granularity level and is directly related to an accuracy level of the electronic transaction pattern value. The client device may dictate which factors (or the number of factors) used by the analytics server.

FIG. 5 illustrates generating an electronic transaction pattern value for a dataset, according to an embodiment. Table 500 represents a transaction data that the analytics server may utilize in order to calculate the electronic transaction pattern value for each payment card (e.g., for each dataset that includes the transaction data associated with a different payment card). In the illustrated embodiment, the analytics server calculates two different electronic transaction pattern values for two different payment cards using two different time thresholds. For example, cells 510 represent a method to calculate an electronic transaction pattern value for card A and cells 520 represent a method to calculate an electronic transaction pattern value for card B. As illustrated, the analytics server may analyze data across three months to calculate the electronic transaction pattern value for card A and may use data across six months for card B. The time threshold may be pre-determined, received from the client device, or a dynamic value that could be adjusted by the analytics server.

For example, the data may represent weekly transactions in the auto fuel industry (e.g., filling up a car with gas at a gas station) or groceries, so a three month period may be sufficient. However, if the data represents a less frequently occurring transaction at a wholesale club, a six month period may be more desirable. In one embodiment, the time threshold may be dynamically adjusted to account for the types of transactions. In another embodiment, the time period is extended until there is an adequate confidence level in the data. In the example shown in FIG. 5, although card A 510 has data that may benefit from a longer time threshold, the data presented may already be sufficient to calculate an electronic transaction pattern value.

The analytics server may first query, receive (based on a dynamic time threshold), and analyze all the transaction data associated with a dataset in order to derive an electronic transaction pattern value; if the transaction data does not satisfy a second threshold (e.g., number of transactions are less than the second threshold), the analytics server may increase the dynamic time threshold in order to receive more transaction data. For example, the analytics server may first query and analyze data corresponding to all transactions within the last three months; however, if the number of transactions within the last three months do not satisfy a threshold (e.g., are less than satisfactory), the analytics server may then query and analyze more data (e.g., data corresponding to all transactions within the last six months). The analytics server may iteratively continue adjusting the dynamic time threshold until an electronic transaction pattern value is derived. In some embodiment, the analytics server (as described above) may receive the time thresholds from the client device, the transactional analytics server, or any other outside sources associated with the client or a merchant (e.g., using a merchant category code (MCC)).

As illustrated in FIG. 5, the analytics server uses transaction amounts in different categories to calculate the electronic transaction pattern value, which comprises a string of alphanumerical values. The analytics server may evaluate all the payment card transactions belonging to six different categories or industries (e.g., dining industry, auto fuel industry, groceries, home improvement, leisure, wholesale club) and may compare the amount spent for each respective category to a national average spending amount in order to calculate an alphanumerical value for each category. For example, the analytics server may determine that card A has a total of $500 in transactions associated with home improvement. The analytics server may then determine that the national average spending amount for home improvements is $150. The analytics server may sometimes query a database especially designed to store national data (not shown) for that purpose. The analytics server may then determine the home improvement index by dividing the card spending amount by the national amount (500/150=3.3). The analytics server may then assign an alphanumerical value based on the index. For example, the analytics server may (based on pre-determined set of rules) determine that an index of 3.3 falls in the range of 4>X>3 and designate an "F" to Card A in the home improvement category. The analytics server may continue the same method for all the above-mentioned categories and calculate an electronic transaction pattern alphanumerical string for card A (e.g., 3ACFG1). The analytics server may choose the position for each alphanumerical value based on a predetermined set of rules. For example, the analytics server may always place an alphanumerical value representing dining transaction as the first character of the alphanumerical string. The analytics server may also augment the electronic transaction pattern value by other personally non-identifiable information, such as location, gender, income, presence of children (e.g., dependent cards), and age. This information may be received directly from the card issuing computing system (e.g., the analytics server may query the card-issuing database to obtain such information). The analytics server may also use merchant's information (e.g., location, time of purchase, and the like) to augment the electronic transaction pattern value. For example, if a consumer purchases breakfast from the same merchant and around the same time each day or week, the analytics server may note the zip code of the merchant and use the zip code of the merchant as an indicator within the electronic transaction pattern value. The analytics server may also use this geographic data when comparing two different pattern strings (e.g., a newly activated card is more likely a match with an inactive card if the transactions are performed within the same zip code). In another non-limiting example, the electronic transaction pattern value may also include a character representing a frequency of purchase (e.g., a cardholder may purchase gas within the same geographic location every Saturday). As stated above, the number of alphanumerical strings within an electronic transaction pattern value may be dictated by the client device. For example, the merchant may only require an electronic transaction pattern value with three alphanumerical strings.

At step 340, the analytics server may identify a set of orphan datasets comprising a first orphan dataset. The analytics server may determine one or more newly-activated payment cards (e.g., orphan payment cards and their corresponding orphan datasets). As described above, the analytics server may query different databases storing transaction data corresponding to different payment cards (e.g., database 242, 250, and/or 250). The analytics server may determine orphan datasets (e.g., newly activated or without an established electronic transaction pattern) based on the payment cards not having any transactions within a predetermined time period. For example, if a dataset indicates that a payment card's first transaction has occurred within the last week (or any other pre-determined time period), the analytics server may determine that the dataset is newly activated (e.g., orphan). The use of the phrase orphan refers to a dataset for which the analytics server has not derived an electronic transaction pattern. "Orphan" and "newly activated" are used interchangeably and refer to the same payment card or dataset.

At step 350, the analytics server may determine a second electronic transaction pattern value for the inactive datasets. The analytics server may use the above-mentioned methods (step 310) to derive an electronic transaction pattern value for the orphan datasets (e.g., newly activated payment card).

At step 360, upon the first and the second electronic transaction pattern value satisfying a similarity threshold representing a minimum number of identical characters in the first string and the second string, the analytics server may generate an instance within the first inactive dataset that links the first orphan dataset to the first inactive dataset; The analytics server may compare the unique electronic transaction patterns and determine whether they satisfy a similarity threshold. The analytics server may compare the two derived electronic transaction pattern values and determine whether they satisfy a similarity threshold. A similarity threshold may be received from the client device and may comprise a number (or percentage) of identical alphanumerical values within the electronic transaction pattern value for the orphan payment card and the inactive payment card. For example, a similarity threshold of four may represent that if the electronic transaction pattern value share four identical alphanumerical values, they should be considered a match. As a result, pattern 3ACFG09B8N3G and pattern 3ACFG13C2G2F are considered to have satisfied the similarity threshold of four. In another example, the similarity threshold of 50% may require half of the alphanumerical values to be similar for the analytics server to determine the electronic transaction patterns values to be a match. A higher similarity threshold may represent a better match and as such, the client device may dictate an accuracy level associated with matching different datasets. The server may also consider other factors such as recurring payments and recurring payment dates when considering whether the newly activated payment card and the inactive payment card have similar electronic transaction pattern values. For example, two payment cards are more likely linked (e.g., share similar electronic transaction pattern values and possibly share a cardholder) if the transaction data within each respective dataset points towards the same geographical location (e.g., same city or same zip code) and/or include the same recurring charges (e.g., movie subscription services for $9.95 debited from the account on the 3rd of each month). As described above, the analytics server may also consider personally non-identifiable information (age, zip code, and income level of the cardholder) when determining whether two datasets share similar electronic transaction pattern values.

Upon determining that the electronic transaction pattern values of the inactive payment card and the newly activated payment card satisfy the similarity threshold, the analytics server may generate an instance within the database that links the inactive payment card dataset to the orphan (e.g., newly activated) payment card dataset. The analytics server may also modify a data record within the inactive dataset and links the inactive payment card to the newly activated payment card. In some embodiments, the analytics server may also transfer all the transaction data from the orphan dataset to the inactive dataset in order to solve the above-mentioned data interruption.

At step 370, the analytics server may transmit, to the transaction analytics server, an instruction to continue the transaction data analysis associated with the first inactive dataset using data linked from the first orphan dataset. The analytics server may generate and transmit an instruction to the transaction analytics server to continue analyzing transaction data and use transaction data within the orphan dataset to complete the analysis. The analytics server may transmit an electronic notification to a client device comprising at least one of the first inactive dataset, the first orphan dataset, the first and the second users, and the first and the second unique electronic transaction pattern values. The analytics server may also update the GUI described above to display data associated with the newly activated card, electronic transaction pattern values, and other relevant data as described in FIG. 6.

Figure 4:
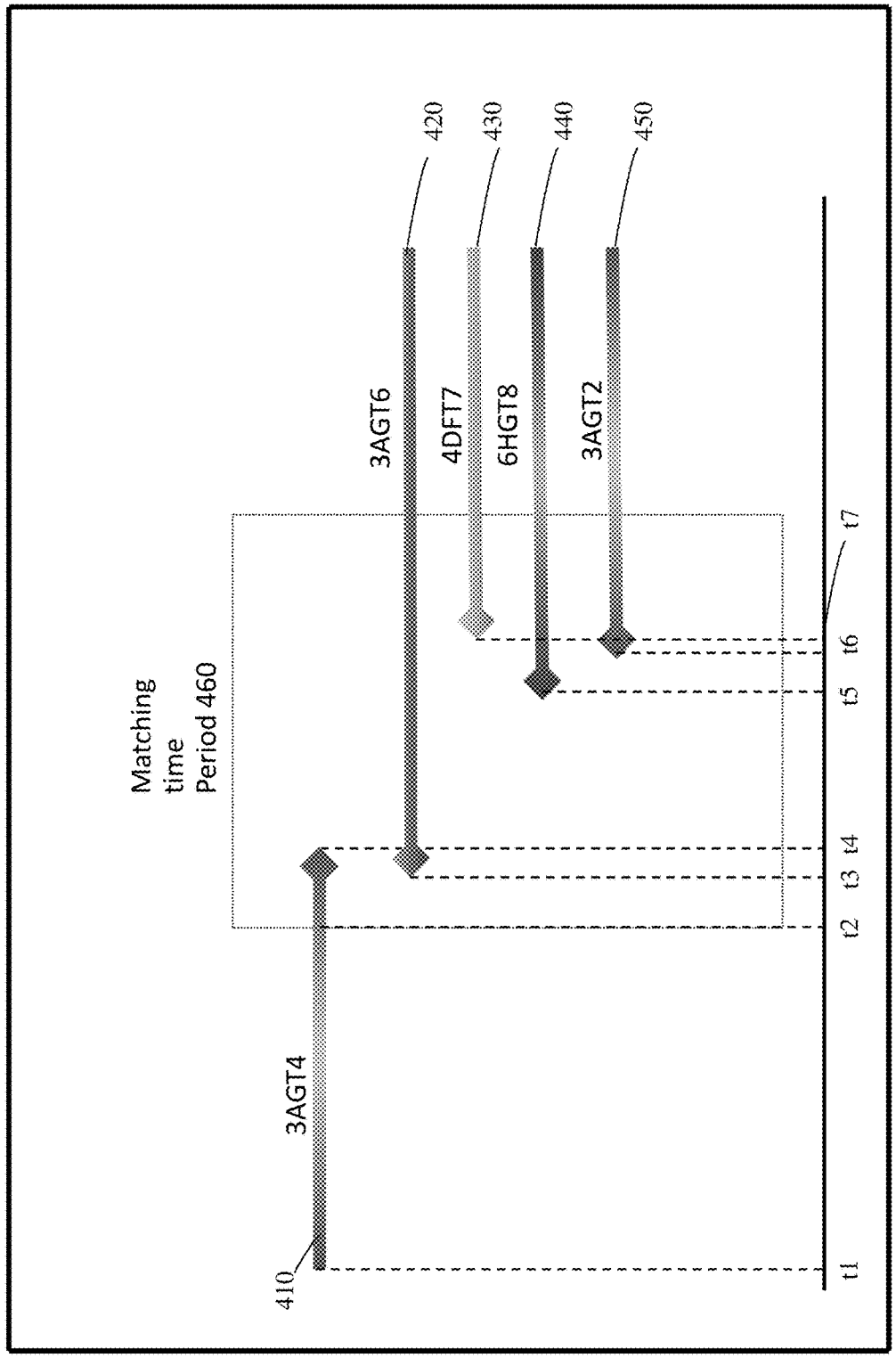
FIG. 4 is a graphical representation of the operational steps for preventing interruptions in transaction data analytics (as described in FIG. 3), according to an embodiment.

FIG. 4 is a graphical representation of the method for preventing interruptions in transaction data analytics (as described in FIG. 3). Graph 400 illustrates a timeline of transaction data received from multiple credit cards (e.g., credit card 410, 420, 430, 440, and 450). Credit card 410 is an active credit card with multiple transactions within the time period of t1-t2. However, the analytics server determines that at time t3, the credit card 410 is inactive because the credit card 410 does not have any transaction data within the time period of t2-t4 (step 310). As explained above, the time period t2-t4 is established based on a received time threshold from the client device. Upon determining that the credit card 410 is inactive and upon receiving an indication of analysis interruption related to the credit card 410, the analytics server may determine an electronic transaction pattern associated with the credit card 410 (step 330). The analytics server may use all the transaction data within the time period t1-t2 to calculate the electronic transaction pattern value. In the illustrated embodiment, the analytics server determines that the electronic transaction pattern value for the credit card 410 is 3AGT4. Subsequently, the analytics server identifies multiple newly activated credit cards (step 340). For example, the analytics server identifies credit cards 420, 430, 440, and 450 as newly activated (e.g., orphan) credit cards because they do not have any transaction data before time t2. For example, credit card 420 has a first transaction at time t3, credit card 430 has a first transaction at time t7, credit card 440 has a first transaction at time at t5 and credit card 450 has a first transaction time of t6. The above-mentioned transactions have all occurred within the matching time period 460, which is another time threshold that is received form the client device. The analytics server may also calculate an electronic transaction pattern value for each of the newly activated credit cards (step 350) and compare the electronic transaction pattern value to the inactive credit card 410 in order to determine which newly activated credit card is associated with the same cardholder as the inactive credit card (step 350). The analytics server may determine the electronic transaction pattern value for credit card 420 to be 3AGT6, credit card 430 to be 4DFT7, credit card 440 to be 6HGT8, and credit card 450 to be 3AGT2. When comparing the electronic transaction pattern values, the analytics server may eliminate the credit card 420 (even though the electronic transaction patterns are similar) because credit card 420 was active during the non-activity period of credit card 410. In other words, credit card 420 had a transaction at time t3, which is within the time period t2-t4. Subsequently, the analytics server selects credit card 450 because the electronic transaction pattern value of credit card 450 is an 80% match with the credit card 410 (e.g., 4 out of 5 characters match). The analytics server may generate an instance within the database corresponding to the credit card 450 that links the transaction data for credit card 450 to transaction data of the credit card 410.

FIG. 6 illustrates different payment cards being displayed on a graphical user interface (GUI) associated with the client computing device. GUI 610 comprises a container 600 that represents a comparison of an inactive card and a newly activated card, which is determined to be associated with the same cardholder because the two credit cards share similar electronic transaction pattern values. The GUI 610 represents a GUI generated by the analytics server and rendered on the client device. The GUI 610 may be a website operated by the analytics server (as described in FIG. 3). The GUI 610 may comprise one or more containers configured to display one or more comparison graphs and charts. The client may modify the content, position, and/or any other graphical attributes of the containers. For example, a client may designate a container to continuously display a spending pattern of an inactive card and the national average of spending in the same category. In the illustrated embodiment, the container 600 displays two different graphs (601 and 602). Graph 601 represents the home improvement spending index of an inactive card and graph 602 represents home improvement spending index of a newly activated card determined to be linked to the inactive card. By displaying the comparison of the two cards, the analytics server can illustrate the similarities of the two cards to the client. Furthermore, the client can modify the display and request another category of spending to be displayed.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   continuously monitoring, by a server, one or more datasets stored in a database, each dataset comprising electronic transaction data corresponding to an electronic payment card;
   detecting, by the server, a set of inactive datasets from the one or more datasets comprising a first inactive dataset including electronic transaction data corresponding to a first electronic payment card associated with a first identifier, wherein an inactive dataset of the set of inactive datasets comprises only electronic transaction data that was generated prior to a pre-determined time period prior to a time of detection of the inactive dataset;

receiving, by the server, from a transaction analytics server, an indication of an interruption of data for transaction data analysis associated with the first inactive dataset;

upon receiving the indication, deriving, by the server, a first electronic transaction pattern value for the first inactive dataset that comprises a first string of alphanumeric characters, where each character and character position in the first string corresponds to at least one of a location, time, and transaction amount associated with each electronic transaction and a total number of electronic transactions associated with the first electronic payment card within the first inactive dataset, wherein deriving the first electronic transaction pattern value comprises determining, by the server, each alphanumeric character of the first string by applying a pre-determined set of rules to transaction data associated with an index of the alphanumeric character of the first string;

identifying, by the server, a set of orphan datasets from the one or more datasets comprising a first orphan dataset including electronic transaction data corresponding to a second electronic payment card associated with a second identifier, wherein an orphan dataset of the set of orphan datasets includes only electronic transaction data that was generated at a time during the pre-determined time period prior to the time of detection of the orphan dataset;

deriving, by the server, a second electronic transaction pattern value for the first orphan dataset a second string of alphanumeric characters, where each character and character position in the second string corresponds to at least one of a location, time, and transaction amount associated with each electronic transaction and a total number of electronic transactions associated with the second electronic payment card within the first orphan dataset, wherein deriving the second electronic transaction pattern value comprises determining, by the server, each alphanumeric character of the second string by applying the pre-determined set of rules to transaction data associated with an index of the alphanumeric character of the second string;

determining, by the server, that the first and the second electronic transaction pattern values satisfy a similarity threshold based on a number of identical characters between the first string and the second string;

upon the first and the second electronic transaction pattern values satisfying the similarity threshold, linking, by the server, the first orphan dataset to the first inactive dataset; and transmitting, by the server, to the transaction analytics server, an instruction to continue the transaction data analysis associated with the first inactive dataset using linked data of the first orphan dataset.

2. The method of claim 1, wherein the first orphan dataset does not comprise electronic transaction data corresponding to any electronic transactions associated with a time value that is similar to a time value for any electronic transactions within the first inactive dataset.

3. The method of claim 1, further comprising:
transmitting, by the server, an electronic notification to a client computing device comprising at least one of the first inactive dataset, the first orphan dataset, the first and the second identifiers, and the first and the second electronic transaction pattern values.

4. The method of claim 1, wherein the similarity threshold is received from a client computing device.

5. The method of claim 1, further comprising:
transmitting, by the server, transaction data within the first orphan dataset to the first inactive dataset.

6. The method of claim 1, wherein the first electronic transaction pattern value is further derived based on one or more transaction amounts corresponding to a spending category relative to a national transaction amount corresponding to the same spending category.

7. The method of claim 1, further comprising:
rendering, by the server, a graphical user interface on a client computing device displaying the transaction data analysis associated with the first inactive dataset performed by the transaction analytics server.

8. The method of claim 7, wherein rendering the graphical user interface comprises rendering the first or the second electronic transaction pattern values on the graphical user interface.

9. The method of claim 1, wherein the similarity threshold comprises comparing transaction amounts corresponding to recurring transactions within the first orphan dataset and the first inactive dataset.

10. The method of claim 1, wherein the similarity threshold comprises comparing transaction dates corresponding to recurring transactions within the first orphan dataset and the first inactive dataset.

11. A computer system comprising:
a database comprising one or more datasets comprising electronic transaction data corresponding to an electronic payment card;
an analytics server comprising a first processor and a first non-transitory computer readable medium comprising instructions that are configured to be executed by the first processor to:
continuously monitor one or more datasets stored in the database;
detect a set of inactive datasets from the one or more datasets comprising a first inactive dataset including electronic transaction data corresponding to a first electronic payment card associated with a first identifier, wherein an inactive dataset of the set of inactive datasets comprises only electronic transaction data that was generated prior to a pre-determined time period prior to a time of detection of the inactive dataset;
receive, from the transaction analytics server, an indication of an interruption of data for transaction data analysis associated with the first inactive dataset;
upon receiving the indication, derive a first electronic transaction pattern value for the first inactive dataset that comprises a first string of alphanumeric characters, where each character and character position in the first string corresponds to at least one of a location, time, and transaction amount associated with each electronic transaction and a total number of electronic transactions associated with the first electronic payment card within the first inactive dataset, wherein deriving the first electronic transaction pattern value comprises determining, by the server, each alphanumeric character of the first string by applying a pre-determined set of rules to transaction data associated with an index of the alphanumeric character of the first string;
identify a set of orphan datasets from the one or more datasets comprising a first orphan dataset including electronic transaction data corresponding to a second electronic payment card associated with a second identifier, wherein an orphan dataset of the set of orphan datasets includes only electronic transaction data that was generated at a time during the pre-determined time period prior to the time of detection of the orphan dataset;

derive a second electronic transaction pattern value for the first orphan dataset that comprises that comprises a second string of alphanumeric characters, where each character and character position in the second string corresponds to at least one of a location, time, and transaction amount associated with each electronic transaction and a total number of electronic transactions associated with the second electronic payment card within the first orphan dataset, wherein deriving the second electronic transaction pattern value comprises determining, by the server, each alphanumeric character of the second string by applying the pre-determined set of rules to transaction data associated with an index of the alphanumeric character of the second string;

upon the first and the second electronic transaction pattern value satisfying the similarity, link the first orphan dataset to the first inactive dataset; and transmit to the transaction analytics server, an instruction to continue the transaction data analysis associated with the first inactive dataset using linked data of the first orphan dataset; and the transaction analytics server comprising a second processor and a second non-transitory computer readable medium comprising instructions that are configured to be executed by the second processor to transmit an indication of an interruption of data for transaction data analysis associated with the first inactive dataset.

12. The system of claim 11, wherein the first orphan dataset does not comprise electronic transaction data corresponding to any electronic transactions associated with a time value that is similar to a time value for any electronic transactions within the first inactive dataset.

13. The system of claim 11, wherein the analytics server is further configured to:

transmitting, by the analytics server, an electronic notification to a client computing device comprising at least one of the first inactive dataset, the first orphan dataset, the first and the second identifiers, and the first and the second electronic transaction pattern values.

14. The system of claim 11, wherein the similarity threshold is received from a client computing device.

15. The system of claim 11, wherein the analytics server is further configured to:

transmitting, by the analytics server, transaction data within the first orphan dataset to the first inactive dataset.

16. The system of claim 11, wherein the first electronic transaction pattern value is further derived based on one or more transaction amounts corresponding to a spending category relative to a national transaction amount corresponding to the same spending category.

17. The system of claim 11, wherein the server is further configured to:

rendering, by the analytics server, a graphical user interface on a client computing device displaying the transaction data analysis associated with the first inactive dataset performed by the transaction analytics server.

18. The system of claim 17, wherein the server is configured to render the graphical user interface by rendering the first or the second electronic transaction pattern values on the graphical user interface.

19. The system of claim 11, wherein the similarity threshold comprises comparing transaction amounts corresponding to recurring transactions within the first orphan dataset and the first inactive dataset.

20. The system of claim 11, wherein the similarity threshold comprises comparing transaction dates corresponding to recurring transactions within the first orphan dataset and the first inactive dataset.

* * * * *